US011171714B2

(12) United States Patent
Shimazaki

(10) Patent No.: US 11,171,714 B2
(45) Date of Patent: Nov. 9, 2021

(54) CELL OPTIMIZATION BY REMOTE CONTROL VIA COMMUNICATION LINE FOR HAPS FLIGHT CONTROL

(71) Applicant: HAPSMobile Inc., Tokyo (JP)

(72) Inventor: Yoshihito Shimazaki, Tokyo (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 15/734,297

(22) PCT Filed: May 29, 2019

(86) PCT No.: PCT/JP2019/021352
§ 371 (c)(1),
(2) Date: Dec. 2, 2020

(87) PCT Pub. No.: WO2019/235329
PCT Pub. Date: Dec. 12, 2019

(65) Prior Publication Data
US 2021/0226691 A1 Jul. 22, 2021

(30) Foreign Application Priority Data
Jun. 6, 2018 (JP) .............................. JP2018-108484

(51) Int. Cl.
*H04B 7/185* (2006.01)
*H04W 16/08* (2009.01)
*H04W 16/26* (2009.01)

(52) U.S. Cl.
CPC ........ *H04B 7/18504* (2013.01); *H04W 16/08* (2013.01); *H04W 16/26* (2013.01)

(58) Field of Classification Search
CPC ... H04B 7/18504; H04W 16/08; H04W 16/26
(Continued)

(56) References Cited

U.S. PATENT DOCUMENTS 10,200,109 B2* 2/2019 Feria ..................... H04L 5/0023
2002/0104920 A1* 8/2002 Thompson ............. H04B 7/185
244/3.14
(Continued)

FOREIGN PATENT DOCUMENTS

JP 2004-500786 A 1/2004
JP 2013-526227 A 6/2013
(Continued)

OTHER PUBLICATIONS

Lte, ARIB, "Evolved Universal Terrestrial Radio Access (E-UTRA) and Evolved Universal Terrestrial Radio Access Network (E-UTRAN)", 3GPP TS 36.300, ARIB STD-T104-36.300, V10.12.0, Overall description, Stage 2, Release 10, Dec. 2014.
(Continued)

*Primary Examiner* — Nghi H Ly
(74) *Attorney, Agent, or Firm* — Muirhead and Saturnelli, LLC

(57) ABSTRACT

A relay communication station is remotely controlled without increasing communication traffic of a feeder link of communication to be relayed between a communication relay apparatus such as a HAPS located in an upper airspace and a communication network on the ground side or on the sea side. The communication relay apparatuses 10 and 20 comprise relay communication stations 110 and 210 that are respectively mounted on flying objects and relay communications between a terminal apparatus and a communication network via a feeder link for mobile communication, radio communication section 120 and 121 that transmit and receive control information to and from a remote control apparatus via a radio communication line for flight control different from the feeder link for mobile communication, and control sections (cell-optimization processing sections 122 and 123) that respectively control the relay communication stations based on the control information received
(Continued)

from the remote control apparatus by the radio communication section.

11 Claims, 8 Drawing Sheets

(58) Field of Classification Search
USPC ........ 375/262, 214, 220, 275; 370/277, 316; 455/431, 98
See application file for complete search history.

(56) References Cited

U.S. PATENT DOCUMENTS

2017/0085411 A1   3/2017   Noerpel et al.
2017/0353960 A1   12/2017  Heninwolf et al.

FOREIGN PATENT DOCUMENTS

| JP | 2017-098797 A | 6/2017 |
| JP | 2017-121009 A | 7/2017 |
| JP | 2017-521962 A | 8/2017 |
| WO | WO 2008/109860 A2 | 9/2008 |
| WO | WO 2018/071453 A1 | 4/2018 |

OTHER PUBLICATIONS

Lte, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN)," 3GPP TS 36.300, V13.5.0, Overall description, State 2, Release 13, Sep. 2016.

* cited by examiner

CELL OPTIMIZATION BY REMOTE CONTROL VIA COMMUNICATION LINE FOR HAPS FLIGHT CONTROL

TECHNICAL FIELD

The present invention relates to a cell optimization by a remote control via a communication line for flight control of a communication relay apparatus such as a HAPS with a relay communication station mounted on a flying object.

BACKGROUND ART

There is conventionally known a communication standard called LTE-Advanced Pro (see Non-Patent Literature 2), which is an extension of LTE (Long Term Evolution)-Advanced (see Non-Patent Literature 1) of 3GPP, which is a communication standard for mobile communication systems. In this LTE-Advanced Pro, specifications have been established for providing communications to recent devices for IoT (Internet of Things). Herein, "IoT" is a general term for a form in which various things are connected to the Internet or the cloud, and control/information communications are performed.

CITATION LIST

Non-Patent Literature

Non-Patent Literature 1: 3GPP TS 36.300 V10.12.0 (2014-12).
Non-Patent Literature 2: 3GPP TS 36.300 V13.5.0 (20164-09).

SUMMARY OF INVENTION

Technical Problem

The applicant of this application has been developing, as a communication system capable of realizing a three-dimensional network by radio communications with terminal apparatuses including the device for IoT, a system for positioning a communication relay apparatus such as a HAPS with a relay communication station mounted on a flying object in an airspace of a predetermined altitude by an autonomous control or external control and for relaying communications of terminal apparatuses located on the ground or in an upper airspace in a three-dimensional cell constructed by the communication relay apparatus. In this system, it is conceivable to perform a remote control from the ground side or the sea side so as to perform a cell optimization process and so on for optimizing a cell formed by the communication relay apparatus such as the HAPS located in an upper airspace. In this case of remote control, if the control information transmitted from the remote control apparatus on the ground side or the sea side to the communication relay apparatus in the upper airspace is transmitted using a feeder link of a mobile communication to be relayed, there is a problem that communication traffic of the feeder link is increased and an effective use of radio resources used for the feeder link is hindered.

Solution to Problem

A communication relay apparatus according to an aspect of the present invention comprises a relay communication station that is mounted on a flying object and relays communication between a terminal apparatus and a communication network via a feeder link for mobile communication, a radio communication section that transmits and receives control information to and from a remote control apparatus via a radio communication line for flight control different from the feeder link for mobile communication, and a control section that controls the relay communication station based on the control information received from the remote control apparatus by the radio communication section.

In the foregoing communication relay apparatus, the control section may perform a cell optimization process for optimizing a cell formed by the relay communication station based on the control information received from the remote control apparatus by the radio communication section.

In the foregoing communication relay apparatus, the cell optimization process may include a cell adjustment process for adjusting at least one of a position and a size of the cell by controlling the relay communication station.

In the foregoing communication relay apparatus, the cell adjustment process may be for changing at least one of the position and the size of the cell so as to reduce a difference in number of terminal apparatuses connected to each cell between a plurality of cells formed by the relay communication station of the communication relay apparatus, or between a cell formed by the relay communication station of the communication relay apparatus and a cell formed by another relay communication station mounted on another flying object.

In the foregoing communication relay apparatus, the communication relay apparatus may comprise an information-transmission processing section for performing a process of transmitting information for traffic analysis for analyzing traffic of a cell formed by the relay communication station, from the radio communication section to the remote control apparatus.

In the foregoing communication relay apparatus, a frequency band of the radio communication line for flight control used by the radio communication section for radio communication with the remote control apparatus may be a frequency band lower than a frequency band of the feeder link performed by the relay communication station with the communication network.

In the foregoing communication relay apparatus, the relay communication station may be a base station or a repeater for mobile communication.

A communication system according to another aspect of the present invention comprises the communication relay apparatus described above, and a remote control apparatus that generates control information for the relay communication station of the communication relay apparatus and transmits the control information to the communication relay apparatus.

A cell optimization system according to still another aspect of the present invention comprises the communication relay apparatus described above, and a remote control apparatus that generates control information for optimizing a cell formed by the relay communication station of the communication relay apparatus and transmits the control information to the communication relay apparatus.

Advantageous Effects of Invention

According to the present invention, it is possible to remotely control a relay communication station so as to perform a cell optimization process and so on without increasing communication traffic of a feeder link of a communication to be relayed between a communication relay apparatus such as a HAPS located in an upper airspace and a communication network on the ground side or on the sea side.

DESCRIPTION OF EMBODIMENTS

Hereinafter, embodiments of the present invention will be described with reference to the drawings.

Figure 1:
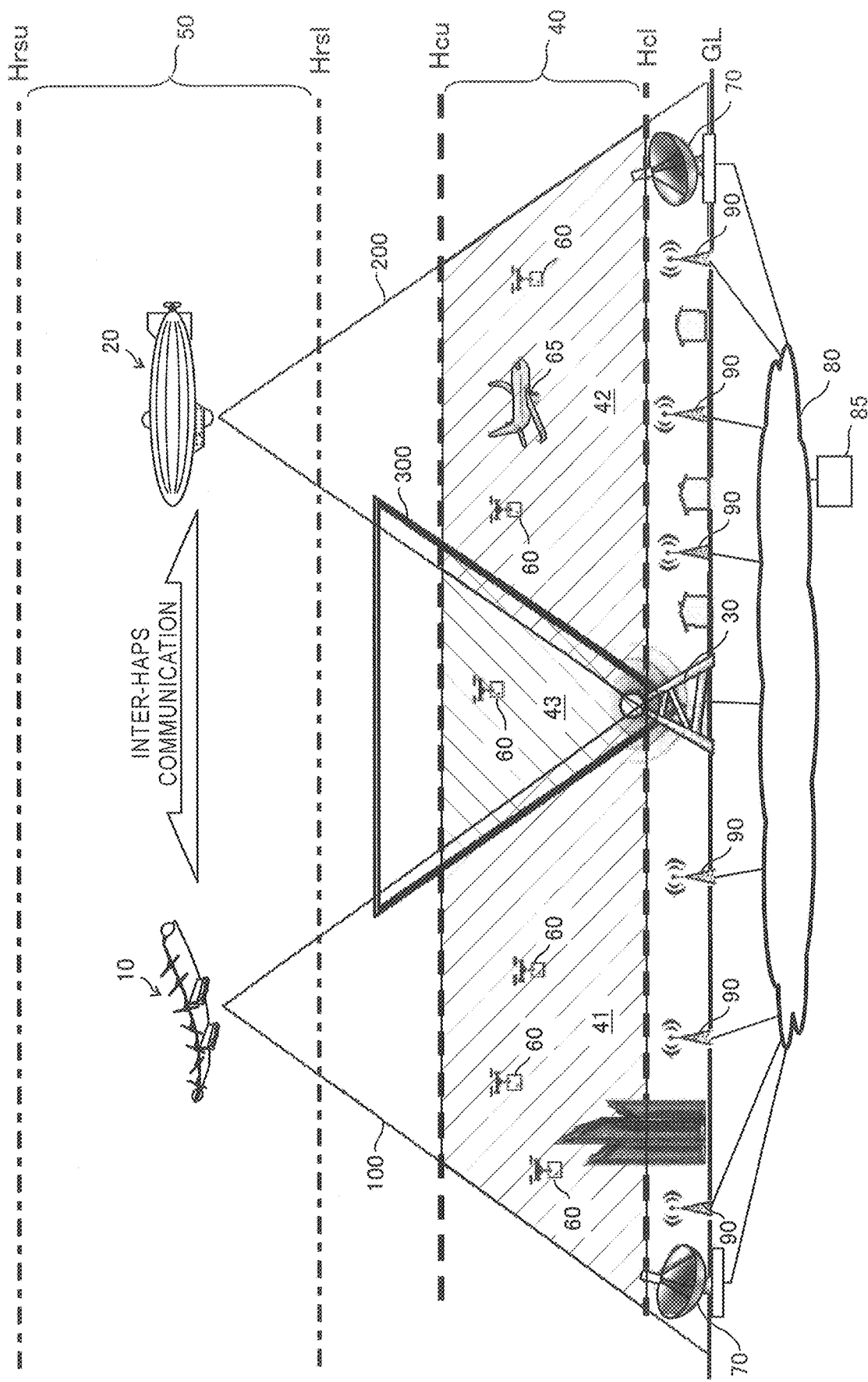
FIG. 1 is a schematic configuration diagram showing an example of an overall configuration of a communication system according to an embodiment of the present invention.

FIG. 1 is a schematic configuration diagram showing an example of an overall configuration of a communication system according to an embodiment of the present invention.

The communication system according to the present embodiment is suitable for realizing a three-dimensional network of future mobile communications such as the fifth generation or the next and subsequent generations complying with a simultaneous connection to a large number of terminal apparatuses, low delay method and so on.

As shown in FIG. 1, the present communication system is provided with High-Altitude Platform Stations (HAPSs) (also referred to as "High-Altitude Pseudo Satellites") 10 and 20 as a plurality of flight type (aerial floating type) communication relay apparatuses. The HAPSs 10 and 20 are configured with a flying object with the communication relay apparatus, are located in an airspace at a predetermined altitude, and form three-dimensional cells (three-dimensional areas) 41 and 42 as indicated by hatching areas in the figure in a cell-formation target airspace 40 at a predetermined altitude. The HAPSs 10 and 20 in the present embodiment are those in which relay communication stations are mounted on flying objects (solar plane, airship, etc.) that are controlled by an autonomous control or an external control so as to float (fly) and be located in a floating airspace 50 with high altitude of 100 [km] or less from the ground level or the sea level.

The airspace 50 in which the HAPSs 10 and 20 are located is, for example, a stratospheric airspace with altitude greater than 11 [km] and less than 50 [km]. The airspace 50 may be an airspace in an altitude of 15 [km] or more and 25 [km] or less where weather conditions are relatively stable, and may be an airspace with altitude of about 20 [km] in particular. Each of Hrsl and Hrsu in the figure indicates relative altitudes of the lower end and the upper end of the airspace 50 with reference to the ground level (GL), in which the HAPSs 10 and 20 are located.

The cell-formation target airspace 40 is a target airspace for forming a three-dimensional cell with one or two or more HAPSs according to the communication system of the present embodiment. The cell-formation target airspace 40 is an airspace in a predetermined altitude range (for example, altitude range of 50 [m] or more and 1000 [m] or less) located between the airspace 50 where the HAPSs 10 and 20 are located and a cell-formation area near the ground level covered by a base station 90 such as a conventional macro-cell base station. Each of Hcl and Hcu in the figure indicates relative altitudes of the lower end and the upper end of the cell-formation target airspace 40 with reference to the ground level (GL).

It is noted that, the cell-formation target airspace 40 where the three-dimensional cell of the present embodiment is formed may be an airspace over the sea, a river or a lake.

The relay communication stations of the HAPSs 10 and 20 respectively forms beams 100 and 200 toward the ground for wirelessly communicating with a terminal apparatus that is a mobile station. The terminal apparatus may be a communication terminal module incorporated in a drone 60 that is an aircraft such as a small helicopter capable of remotely steering, or may be a user apparatus used by a user in an airplane 65. The areas through which the beams 100 and 200 pass in the cell-formation target airspace 40 are three-dimensional cells 41 and 42. The plurality of beams 100 and 200 adjacent to each other in the cell-formation target airspace 40 may be partially overlapped with each other.

Each of the relay communication stations of the HAPSs 10 and 20 is connected to a core network of a mobile communication network 80 via a feeder station (gateway) 70 which is a relay station installed on the ground or on the sea. A communication between the HAPSs 10 and 20 and the feeder station 70 may be performed by a radio communication using a radio wave such as a microwave, or may be performed by an optical communication using a laser light or the like.

Each of the HAPSs 10 and 20 may autonomously control its own flight movement and a process in the relay communication station, by executing a control program with a control section including a computer or the like incorporated inside of the HAPS. For example, each of the HAPSs 10 and 20 may acquire its own current position information (for example, GPS (Global Positioning System) position information), position control information (for example, flight schedule information) stored in advance, and position information on another HAPS located in a peripheral space or the like, and autonomously control the flight movement and the process in the relay communication station base on these kinds of information.

The flight movement and the process in the relay communication station of each of the HAPSs 10 and 20 may be controlled by a remote control apparatus 85 as a management apparatus provided in a communication center or the like of the mobile communication network 80. A communication between the HAPSs 10 and 20 and the remote control apparatus 85 is performed by a communication station for HAPS control 75 which is a facility on the ground or on the sea. Although the communication station for HAPS control 75 preferably uses an omnidirectional antenna so as to be compatible with a plurality of HAPSs 10 and 20, a directional antenna may be used. As such the communication station for HAPS control 75, a GCS (Ground Control System) (ground control station) can be used.

Since the radio communication between the HAPSs 10 and 20 and the communication station for HAPS control 75 includes communications for controlling a flight movement of the HAPSs 10 and 20 and a cell optimization and so on, high reliability and low delay are required. Therefore, for the radio communication between the HAPSs 10 and 20 and the communication station for HAPS control 75, it is preferable to use a frequency band lower than the frequency band used in the radio communication performed between the HAPSs 10 and 20 and the feeder station 70 via the feeder link of mobile communication. For example, when the frequency band of the gigahertz (GHz) band is used for the radio communication performed between the HAPSs 10 and 20 and the feeder station 70, a frequency band of the megahertz (MHz) band is used for the radio communication between the HAPSs 10 and 20 and the communication station for HAPS control 75.

When controlling by the remote control apparatus 85, the HAPSs 10 and 20 may incorporate a communication terminal apparatus (for example, a mobile communication module) for control so as to be able to receive control information from the remote control apparatus 85, and may be assigned terminal identification information (for example, IP address, telephone number, etc.) so that the HAPSs 10 and 20 can be identified from the remote control apparatus 85. The MAC address of the communication interface may be used for identification of the communication terminal apparatus for control. Moreover, each of the HAPSs 10 and 20 may transmits information regarding the flight movement of the own HAPS or a surrounding HAPS and/or the process at the relay communication station, information such as observation data or the like acquired by various sensors, to a predetermined destination such as the remote control apparatus 85.

In the cell-formation target airspace 40, there may be a spatial area where the beams 100 and 200 of the HAPSs 10 and 20 do not pass, in which the three-dimensional cells 41 and 42 are not formed. In order to spatially complement this area, as shown in the configuration example in FIG. 1, a base station (hereinafter referred to as "ATG station") 30 may be disposed, which performs an ATG (Air To Ground) connection by forming a radial beam 300 from the ground side or the sea side upward and forming a three-dimensional cell 43.

By adjusting the positions of the HAPSs 10 and 20 or the divergence angle (beam width) of the beams 100 and 200 or the like, without using the ATG station 30, the relay communication stations of the HAPSs 10 and 20 may form the beams 100 and 200 covering the overall upper end face of the cell-formation target airspace 40 so that three-dimensional cells are formed all over the cell-formation target airspace 40.

It is noted that, the three-dimensional cells formed by the HAPSs 10 and 20 may be formed to reach the ground level or the sea level so that the HAPSs can also communicate with the terminal apparatus located on the ground or on the sea.

Figure 2:
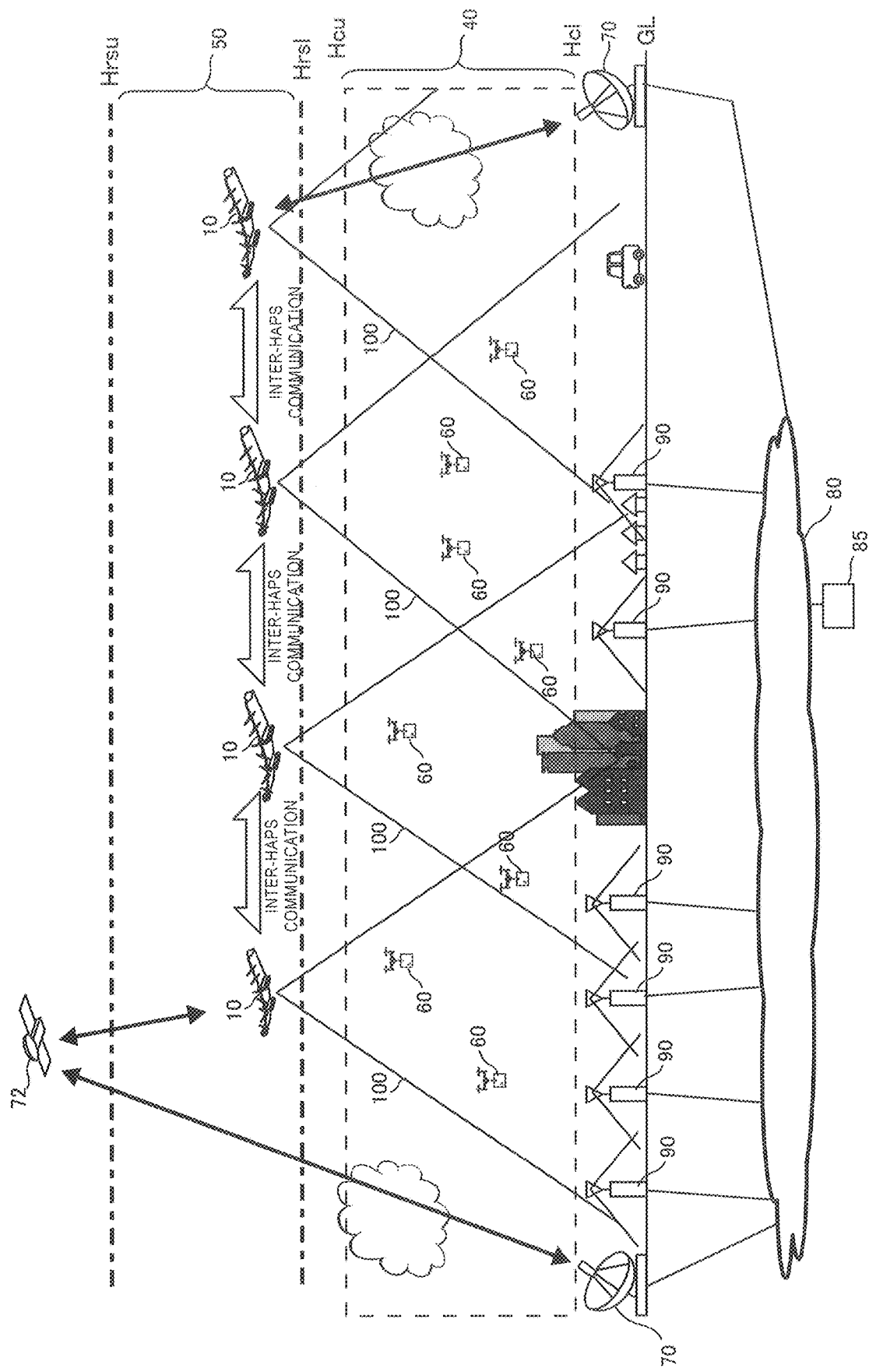
FIG. 2 is a schematic configuration diagram showing an example of an overall configuration of a communication system according to another embodiment.

FIG. 2 is a schematic configuration diagram showing an example of an overall configuration of a communication system according to another embodiment.

It is noted that, in FIG. 2, configuration elements similar to those in FIG. 1 described above are denoted by the same reference numerals and explanations thereof are be omitted.

In the embodiment of FIG. 2, a communication between the HAPS 10 and the core network of the mobile communication network 80 is performed via the feeder station 70 and a low-orbital artificial satellite 72. In this case, a communication between the artificial satellite 72 and the feeder station 70 may be performed by a radio communication using radio waves such as microwaves, or may be performed by optical communication using laser light or the like. Although the communication between the HAPS 10 and the artificial satellite 72 is performed by the radio communication using radio waves such as microwaves, the communication may be performed by the optical communication using laser light or the like.

Figure 3:
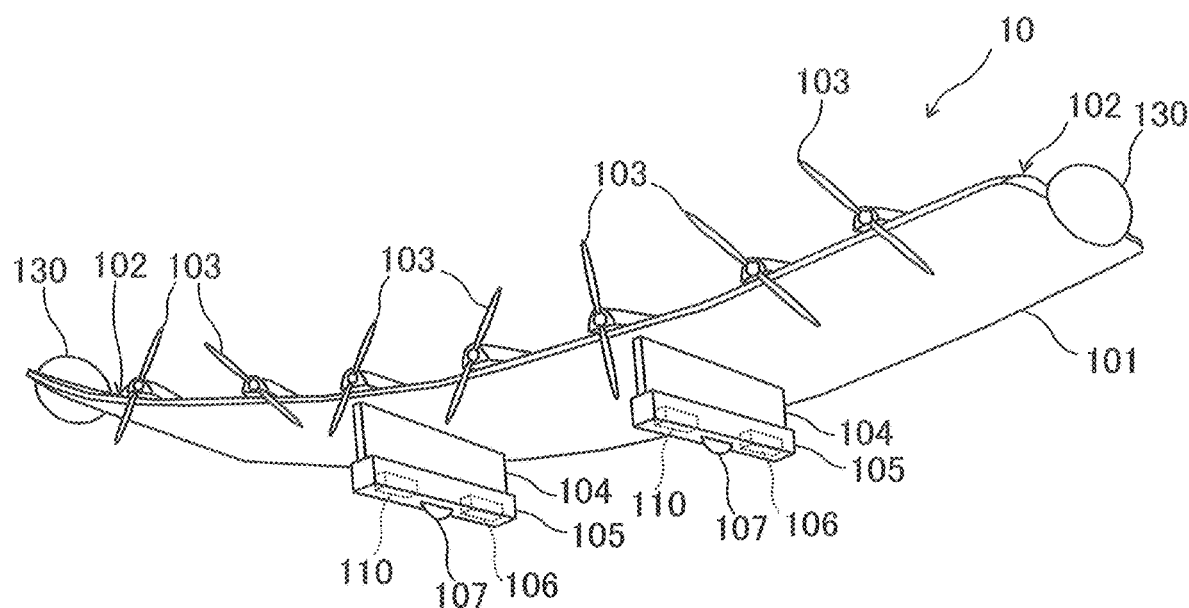
FIG. 3 is a perspective view showing an example of a HAPS used in the communication system in the embodiment.

FIG. 3 is a perspective view showing an example of the HAPS used in a communication system in the embodiment.

The HAPS 10 in FIG. 3 is a solar-plane type HAPS, and has a main wing section 101, and a plurality of motor-driven propellers 103 as propulsion apparatuses of a bus-motive power system provided at one end edge portion of the main wing section 101 in the lateral direction. A solar power generation panel (hereinafter referred to as "solar panel") 102 as a power generator having a solar photovoltaic power generation function is provided on the upper surface of the main wing section 101. Pods 105 as a plurality of apparatus accommodating sections for accommodating the mission equipment are connected to the two positions in the longitudinal direction of the lower surface of the main wing section 101 via a plate-like connecting section 104. This mission equipment may be built in the lower portion of the main wing section 101, or the pod 105 may be directly attached to the lower portion of the main wing section 101 and stored therein. Inside each pod 105, a relay communication station 110 as a mission equipment and a battery 106 as a power storage apparatus are accommodated. The battery 106 may be built in the main wing section 101. On the lower surface side of each pod 105, wheels 107 used on departure and arrival are provided. The electric power generated by the solar panel 102 is stored in the battery 106, the motor of the propeller 103 is rotationally driven by the electric power supplied from the battery 106, and the radio relay process by the relay communication station 110 is executed.

The solar-plane type HAPS 10 can float with lift force by, for example, performing a circular turning flight, or performing a flight along a figure of "8", and can float to stay in a predetermined range in the horizontal direction at a predetermined altitude. It is noted that, the solar-plane type HAPS 10 can also fly like a glider when the propeller 103 is not rotationally driven. For example, the solar-plane type HAPS 10 can rise up to a high position when electric power of the battery 106 is surplus by power generation of the solar panel 102, such as in daytime, and can fly like a glider by stopping the power supply from the battery 106 to the motor when an electric power cannot be generated by the solar panel 102, such as at night.

The HAPS 10 may be provided with a radio power-receiving apparatus that generates electric power by receiving an energy beam such as a high-power microwave beam for power supply transmitted from a microwave power-transmitting apparatus as a radio power-transmitting apparatus.

The HAPS 10 may be provided with, for example, as shown in FIG. 3, a radio-communication antenna apparatus 140 as a communication section used for radio communication by radio waves such as microwaves with another HAPS or an artificial satellite. The communication section used for the radio communication with the other HAPS or the artificial satellite is not limited to that of performing the radio communication by radio waves such as microwaves, and the communication may be a communication by another method such as an optical communication.

Figure 4:
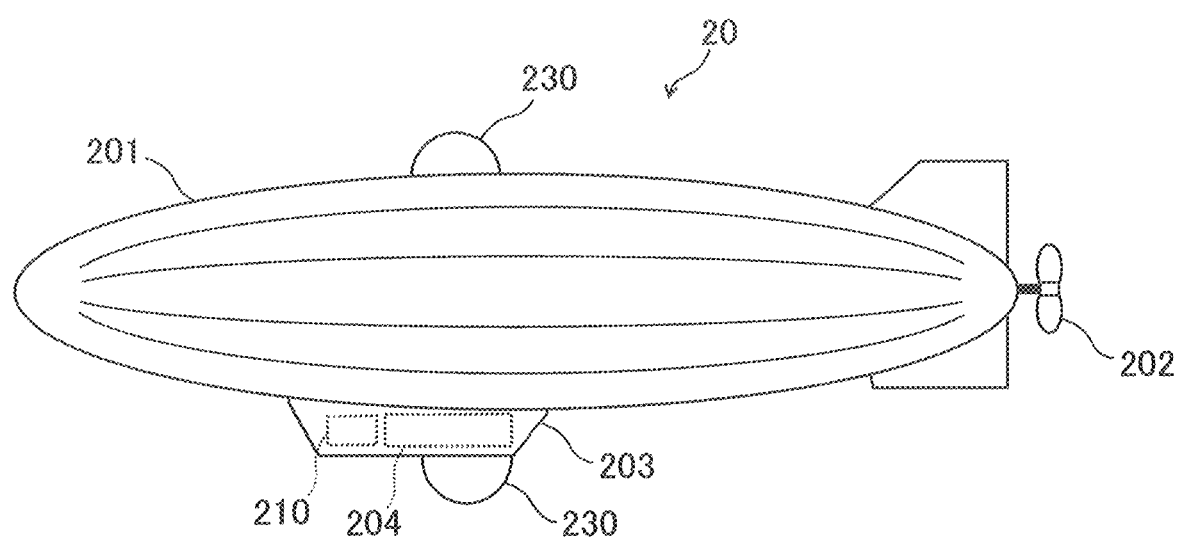
FIG. 4 is a side view showing another example of a HAPS used in the communication system in the embodiment.

FIG. 4 is a perspective view showing another example of a HAPS used in a communication system in the embodiment.

The HAPS 20 in FIG. 4 is an unmanned-airship type HAPS, and can mount a large capacity battery since the payload is large. The HAPS 20 includes an airship body 201 filled with gas such as helium gas for floating by floating power, motor-driven propellers 202 as propulsion apparatuses of bus-motive power system, and an equipment accommodating section 203 in which mission equipment is accommodated. A relay communication station 210 and a battery 204 are accommodated in the equipment accommodating section 203. The motor of the propeller 202 is rotationally driven by an electric power supplied from the battery 204, and a radio relay process by the relay communication station 210 is executed.

The unmanned-airship type HAPS 20 may be also provided with the radio power-receiving apparatus that generates electric power by receiving an energy beam such as a high-power microwave beam for power supply transmitted from the microwave power-transmitting apparatus.

It is noted that, a solar panel having a photovoltaic power generation function may be provided on the top surface of the airship body 201, and the electric power generated by the solar panel may be stored in the battery 204.

The unmanned-airship type HAPS 20 may be provided with, for example, as shown in FIG. 4, the radio-communication antenna apparatus 140 with three-dimensional directivity as a communication section used for radio communication by radio waves such as microwaves with another HAPS and an artificial satellite. The communication section used for radio communication with the other HAPS or the artificial satellite is not limited to that of performing the radio communication by radio waves such as microwaves, and the communication may be a communication by another method such as an optical communication.

Figure 5:
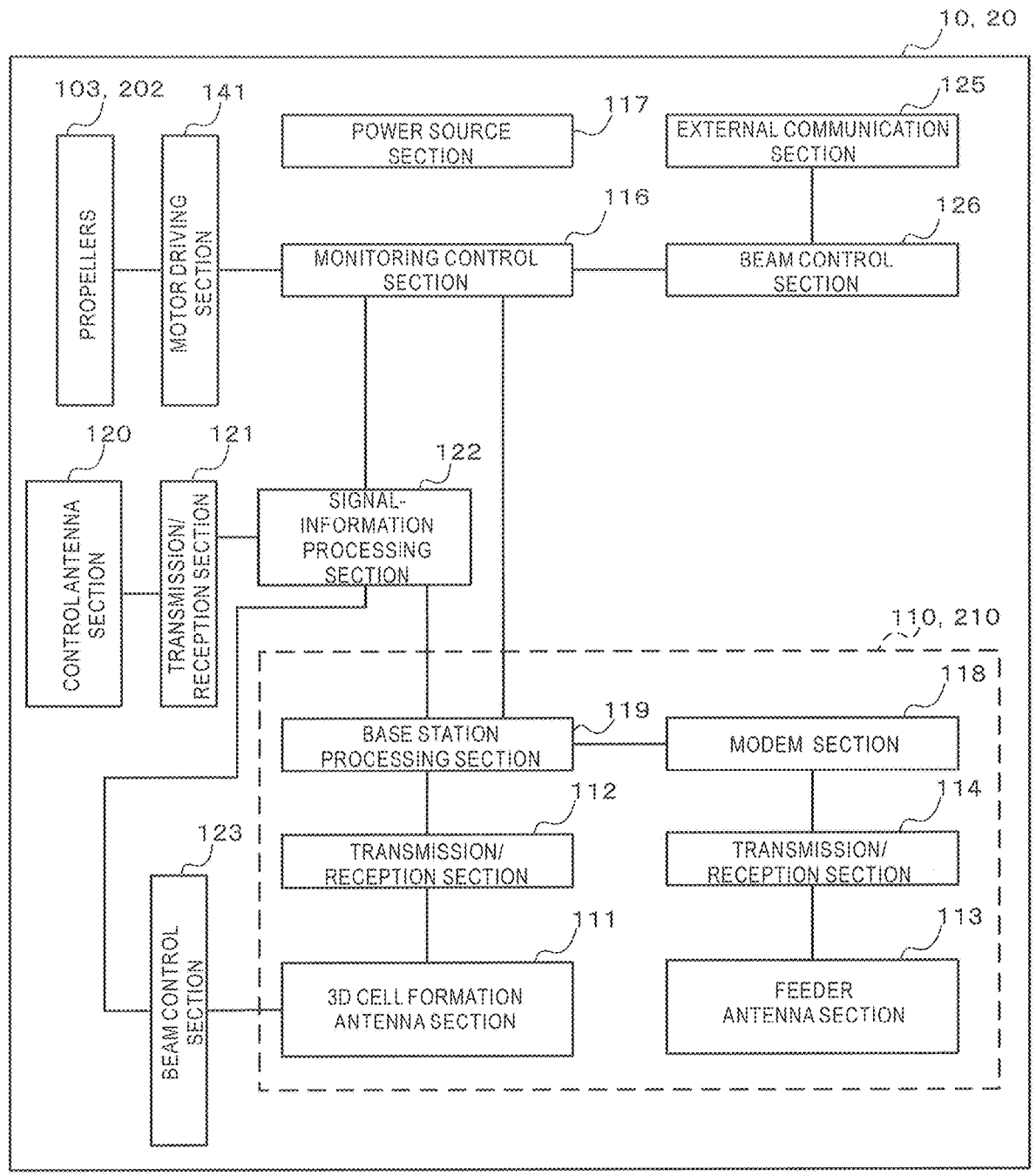
FIG. 5 is a block diagram showing a configuration example of a HAPS in the embodiment.

FIG. 5 is a block diagram showing a configuration example of the HAPSs 10 and 20 in the present embodiment. It is noted that, in FIG. 5, although the relay communication stations 110 and 210 in the present embodiment show an example of a radio relay station, relay communication station of base station type, the relay communication stations 110 and 210 may be a relay communication station of repeater type.

In FIG. 5, each of the HAPSs 10 and 20 includes a 3D cell-formation antenna section 111, a transmission/reception section 112, a feeder antenna section 113, a transmission/reception section 114, a monitoring control section 116, a power source section 117, a modem section 118, a base-station processing section 119, a control antenna section 120, a transmission/reception section 121, a signal-information processing section 122 as a control section that controls the relay communication stations 110 and 210, and a beam control section 123. Furthermore, each of the HAPSs 10 and 20 includes an external communication section 125 used for an inter-HAPS communication and the like, and a beam control section 126.

The 3D cell-formation antenna section 111 has antennas for forming radial beams 100 and 200 toward the cell-formation target airspace 40, and forms three-dimensional cells 41 and 42 in which a communication with the terminal apparatus can be performed. The transmission/reception section 112 constitutes a radio communication apparatus together with the 3D cell-formation antenna section 111, has a transmission/reception duplexer (DUP: DUPlexer) and an amplifier, etc., transmits radio signals to the terminal apparatuses located in the three-dimensional cells 41 and 42, and receives radio signals from the terminal apparatuses via the 3D cell-formation antenna section 111.

The feeder antenna section 113 has a directional antenna for performing a radio communication with the feeder station 70 on the ground or on the sea. The transmission/reception section 114 constitutes another radio communication apparatus together with the feeder antenna section 113, and has a transmission/reception duplexer (DUP: DUPlexer) and an amplifier, etc., and constitutes a feeder link that transmits radio signals to the feeder station 70 and receives radio signals from the feeder station 70 via the feeder antenna section 113.

The monitoring control section 116 is configured with, for example, a CPU and a memory, etc., and monitors and controls the operation processing status of mainly the flying object parts in the HAPSs 10 and 20, by executing a preinstalled program. For example, the monitoring control section 116 controls a motor drive section 141 that drives the propellers 103 and 202 to move the HAPSs 10 and 20 to target positions, and also controls the HAPSs 10 and 20 to stay in the vicinity of the target positions, by executing a control program.

The power source section 117 supplies an electric power outputted from the batteries 106 and 204 to each section in the HAPSs 10 and 20. The power source section 117 may have a function for storing an electric power, which is obtained by converting a microwave beam for power supply by the radio power-receiving apparatus, in the batteries 106 and 204. Furthermore, the power source section 117 may have a function for storing electric power, which is generated by the solar power generation panel or the like and/or externally supplied by wire or the like, in the batteries 106 and 204.

The modem section 118, for example, performs a demodulation processing and a decoding processing for a reception signal received from the feeder station 70 via the feeder antenna section 113 and the transmission/reception section 114, and generates a data signal to be outputted to the base-station processing section 119 side. The modem section 118 performs an encoding processing and a modulation processing for the data signal received from the base-station processing section 119 side, and generates a transmission signal to be transmitted to the feeder station 70 via the feeder antenna section 113 and the transmission/reception section 114.

The base-station processing section 119 has, for example, a function for performing baseband processing based on a method conforming to the standard of LTE/LTE-Advanced. The base-station processing section 119 may process in a method conforming to a future standard of mobile communication such as the fifth generation or the next and subsequent generations.

The base-station processing section 119, for example, performs a demodulating process and a decoding process for a reception signal received from a terminal apparatus located in the three-dimensional cells 41 and 42 via the 3D cell-formation antenna section 111 and the transmission/reception section 112, and generates a data signal to be outputted to the modem section 118 side. The base-station processing section 119 performs an encoding process and a modulating process for the data signal received from the modem section 118 side, and generates a transmission signal to be transmitted to the terminal apparatus in the three-dimensional cells 41 and 42 via the 3D cell-formation antenna section 111 and the transmission/reception section 112.

Uplink and downlink methods for radio communication with a terminal apparatus via the relay communication stations 110 and 210 are not limited to specific methods, but may be, for example, a time division duplex method (Time Division Duplex: TDD) or a frequency division duplex method (Frequency Division Duplex: FDD). An access method for radio communication with a terminal apparatus via the relay communication stations 110 and 210 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using a plurality of antennas for both of transmission and reception. The MIMO technology may be an SU-MIMO (Single-User MIMO) technology in which one base station transmits a plurality of signals to one terminal apparatus at the same time/same frequency, and may be an MU-MIMO (Multi-User MIMO) technology in which one base station transmits signals to a plurality of different communication terminal apparatuses at the same time/same frequency or a plurality of different base stations transmit signals to one terminal apparatus at the same time/same frequency.

The control antenna section 120 has a directional antenna for performing a radio communication with a communication station for HAPS control 75 that is a facility on the ground or on the sea, in order to communicate with the remote control apparatus 85 provided in a communication center or the like in the mobile communication network 80. Since the radio communication with the communication station for HAPS control 75 includes the communication for controlling the flight movement of the HAPSs 10 and 20 as described above, high reliability and low delay are required. Therefore, it is preferable that the control antenna section 120 performs a radio communication using a frequency band lower than the frequency band used by the feeder antenna section 113 that performs a data communication of the terminal apparatus with the feeder station 70. For example, when the feeder antenna section 113 uses a frequency band of the gigahertz band (GHz), the control antenna section 120 uses a frequency band of the megahertz band (MHz).

The transmission/reception section 121 constitutes a radio communication section together with the control antenna section 120, has a duplexer (DUP: DUPlexer) and an amplifier, etc., transmits a radio signal to the communication station for HAPS control 75 on the ground side or on the sea side, and receives a radio signal from the communication station for HAPS control 75 via the control antenna section 120.

The signal-information processing section 122 performs a demodulating process and a decoding process on the reception signal received from the remote control apparatus 85 by the communication station for HAPS control 75 via the control antenna section 120 and the transmission/reception section 121, and generates a data signal related to the reception signal. The signal-information processing section 122 also performs an encoding process and a modulating process on the data signal received from the monitoring control section 116, the base-station processing section 119 and the like, and generates a transmission signal to be transmitted to the communication station for HAPS control 75 via the control antenna section 120 and the transmission/reception section 121. The signal-information processing section 122 also performs an information process in accordance with a predetermined purpose, by executing a predetermined program. Specific contents of the information process are described below.

The beam control section 123 controls beam direction and intensity of radio waves of the 3D-cell formation antenna section 111 according to an instruction from the signal-information processing section. By this control, the positions and sizes of the three-dimensional cells 41 and 42 formed by the 3D-cell formation antenna section 111 can be changed.

The external communication section 125 communicates with surrounding other HAPSs 10 and 20 and the artificial satellite 72 by radio waves such as microwaves. This communication enables a dynamic routing for dynamically relaying a radio communication between the terminal apparatus such as the drone 60 and the mobile communication network 80, and when either HAPS breaks down, the other HAPS backs it up and performs a radio relay, thereby the robustness of the mobile communication system can be improved.

The beam control section 126 controls beam direction and intensity of radio waves used for an inter-HAPS communication and a communication with an artificial satellite, and controls to switch another HAPS (relay communication station) that performs a radio communication according to a change in relative position with surrounding another HAPS (relay communication station). This control may be performed based on, for example, position and attitude of the own HAPS, position of a surrounding HAPS, and the like. Information on the position and attitude of the own HAPS may be acquired based on an output of a GPS receiver, a gyro sensor, an acceleration sensor or the like incorporated in the HAPS, and information on the position of the surrounding HAPS may be acquired from the remote control apparatus 85 provided in the mobile communication network 80 or another HAPS management server.

The HAPSs 10 and 20 in the present embodiment do not necessarily require the batteries 106 and 204, in case of adopting a configuration in which an electric power received by a radio power-receiving apparatus such as a microwave power-receiving section is temporarily stored in the batteries 106 and 204. For example, in case of a system capable of constantly receiving a microwave beam for power supply by a rectenna section, it may be configured so that the power received by the radio power-receiving apparatus is directly supplied to a power consumption apparatus in the bus-motive power system or the mission system. Even if it is not the system capable of constantly receiving the microwave beam for power supply by the rectenna section, when the power received by the radio power-receiving apparatus such as the microwave power-receiving section covers the power during the period when the power generating apparatus does not generate power, by using the power generating apparatus such as the solar panel 102 together, the batteries 106 and 204 are not necessarily required. It is noted that, in the flying object of type of floating with lift force like the HAPS 10, even when it becomes a situation where an electric power cannot be temporarily supplied to the bus-motive power system, the flight can be maintained during the period of the situation, for example, by shifting to the glider mode using a potential energy.

[Information Processing Example 1] Next, an example of controlling a cell optimization process in the relay communication stations 110 and 210 in the present embodiment (hereinafter, the present example is referred to as "information processing example 1") is described.

The present information processing example 1 analyzes the traffic of the three-dimensional cells 41 and 42 formed by the relay communication stations 110 and 210, and performs a cell optimization process for optimizing the three-dimensional cells 41 and 42. In the present information processing example 1, the cell optimization process can be performed without transmitting data from the feeder antenna section 113 to the core network of the mobile communication network 80 via the feeder station 70. Therefore, without increasing the communication load on the core network of the mobile communication network 80, for example, the communication quality of the terminal apparatus in the three-dimensional cells 41 and 42 formed by the HAPSs 10 and 20 can be improved.

As a specific example of control of the cell optimization process according to the present information processing example 1, a cell adjustment process can be exemplified, in which at least one of the positions and sizes of the three-dimensional cells 41 and 42 is adjusted by controlling the 3D cell-formation antenna section 111 so as to improve the communication quality of the terminal apparatus in three-dimensional cells 41 and 42 formed by the HAPSs 10 and 20. It is noted that, the cell optimization process is not limited to the forgoing cell adjustment process as long as it is a process that can specify the traffic with the terminal apparatuses located in the three-dimensional cells 41 and 42 and improve the communication quality of the terminal apparatus.

Figure 6:
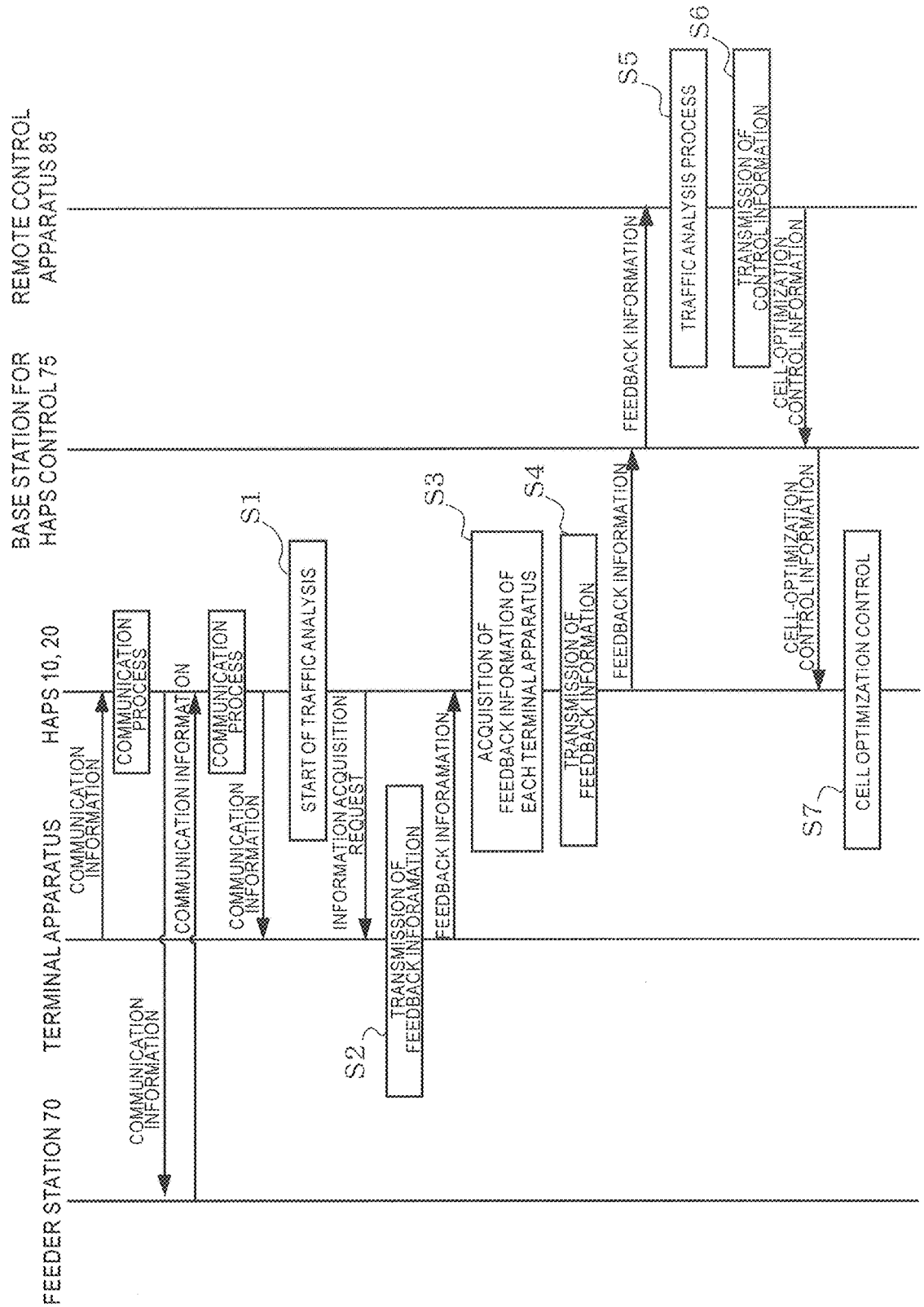
FIG. 6 is a sequence diagram showing an example of cell optimization process according to the information processing example 1.

FIG. 6 is a sequence diagram showing an example of control of the cell optimization process according to the present information processing example 1.

Figure 7:
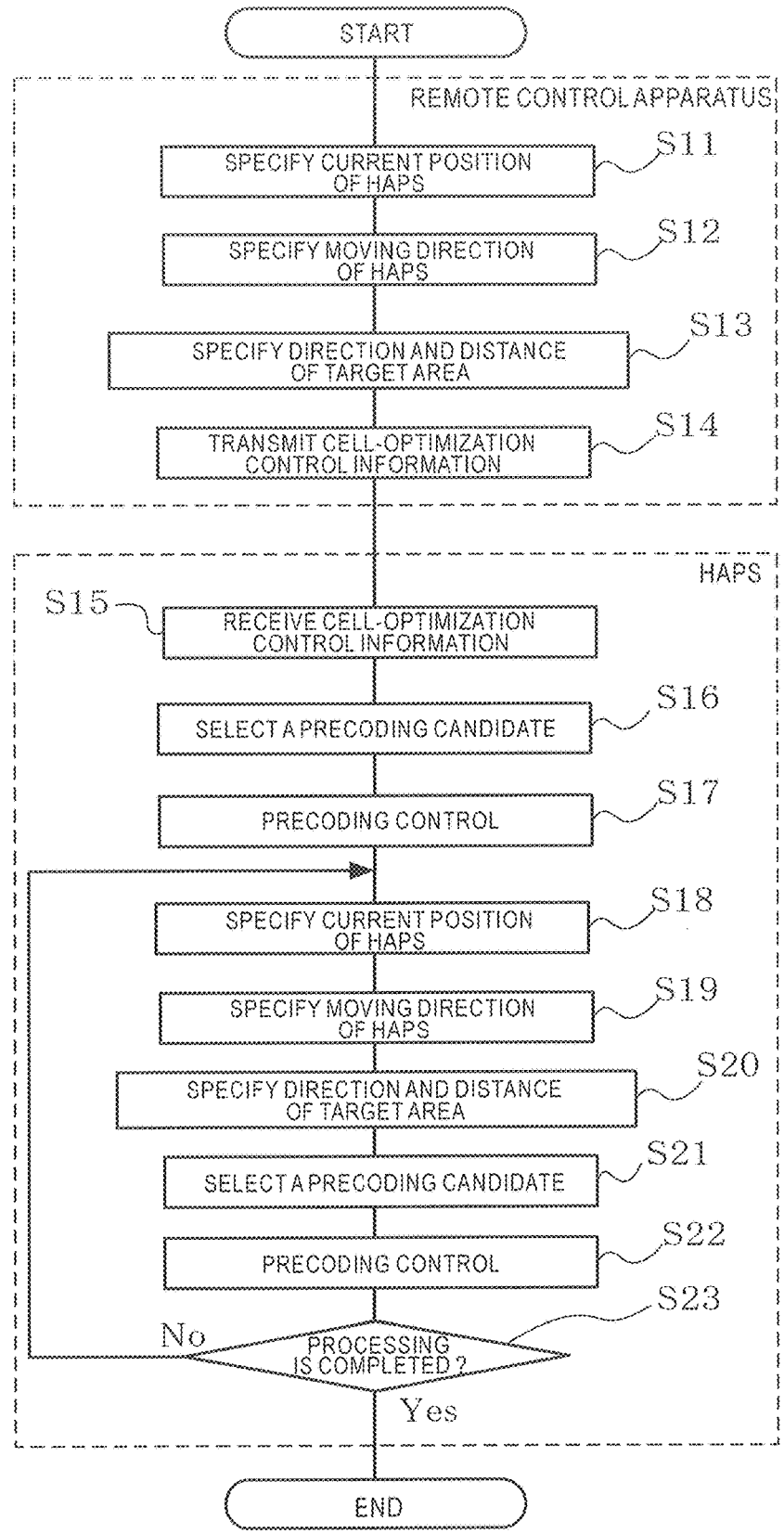
FIG. 7 is a flowchart showing a flow of a series of the cell optimization processes including a beam control for changing a position and a size of three-dimensional cell formed by a 3D-cell formation antenna section in the information processing example 1.

A terminal apparatus such as a communication terminal module incorporated in the drone 60, a user apparatus used by the user in the airplane 65 or a user apparatus used by the user on the ground is, as shown in FIG. 7, is connected to the core network of the mobile communication network 80 through the base-station type HAPSs 10 and 20 via the feeder station 70, and can transmit and receive communication information.

In the present information processing example 1, the signal-information processing section 122 mounted on the HAPSs 10 and 20 starts a traffic analysis process when a predetermined traffic-analysis start condition is satisfied (S1). The traffic-analysis start condition can be arbitrarily set to, for example, a condition that an analysis start timing has arrived due to a preset date and time or a predetermined time interval, a condition that an amount of data transmitted or received by the terminal apparatus through the HAPSs 10 and 20 exceeds a specified amount, a condition that an analysis start instruction is received from the remote control apparatus 85 on the ground side or on the sea side, or the like.

When the traffic analysis process is started (S1), the signal-information processing section 122 in the HAPSs 10 and 20 transmits an information acquisition request for the traffic analysis from the 3D cell-formation antenna section 111 to the terminal apparatuses located in the three-dimensional cells 41 and 42. Each terminal apparatus, which has received this information acquisition request, transmits feedback information as predetermined information for a traffic analysis related to the information acquisition request, and the 3D cell-formation antenna section 111 receives the feedback information. The feedback information of each terminal apparatus, which is received by the 3D cell-formation antenna section 111, is acquired by the signal-information processing section 122 via the transmission/reception section 112 and the base-station processing section 119 (S3).

The signal-information processing section 122 transmits the acquired feedback information of each terminal apparatus from the transmission/reception section 121 and the control antenna section 120 to the communication station for HAPS control 75 (S4). Then, the feedback information transmitted to the communication station for HAPS control 75 is received by the remote control apparatus 85. The remote control apparatus 85 performs a traffic analysis process for analyzing the traffic of the three-dimensional cells 41 and 42 of the HAPSs 10 and 20 based on the received feedback information (S4).

In the traffic analysis process, for example, current position information and moving direction information of the target HAPSs 10 and 20, and position information and used-band information of each terminal apparatus located in the three-dimensional cells 41 and 42 of the HAPSs 10 and 20 are acquired as feedback information, and which band is used at which position in the three-dimensional cells 41 and 42 by how many number of terminal apparatuses are analyzed. Then, it is determined whether or not a predetermined cell-optimization execution condition is satisfied, and if the predetermined cell-optimization execution condition is satisfied, control information for improving the communication quality of the terminal apparatus located in the three-dimensional cells 41 and 42 is generated.

The cell-optimization execution condition is a condition for determining whether or not it is necessary to improve the communication quality of the terminal apparatus based on the result of the traffic analysis, and can be set arbitrarily. The cell-optimization execution condition may be, for example, a condition that the number of terminal apparatuses that perform communications in a predetermined frequency band within a limited range in the three-dimensional cells 41 and 42 exceeds a specified number.

When such a cell-optimization execution condition is satisfied, the remote control apparatus 85 determines that it is necessary to execute the cell optimization control, and generates control information for the cell optimization control. This cell-optimization control information is transmitted from the remote control apparatus 85 to the signal-information processing section 122 of the HAPSs 10 and 20 by the communication station for HAPS control 75 via the control antenna section 120 and the transmission/reception section 121 of the HAPSs 10 and 20 (S6).

It is noted that, the generation of control information for the cell optimization control based on the traffic analysis process and its analysis results may be generated by the EPC (Evolved Packet Core) apparatus provided in the mobile communication network 80, based on the feedback information received via the remote control apparatus 85. The EPC apparatus functions as a core network apparatus for mobile communication, and provides, for example, an MME (Mobile Management Entity) function that performs connection/disconnection of terminal apparatuses, a mobility control of terminal apparatuses between base stations, a position management and a calling of terminal apparatuses, an HSS (Home Subscriber Server) function that performs a subscriber authentication and a security management, a P-GW (Packet Data Network Gateway) function that performs an IP address management and a transmission quality control, an S-GW (Serving Gateway) function that performs an IP packet transfer, or the like. The EPC apparatus can perform the functions required for the LTE core network defined in 3GPP on a single hardware platform.

The signal-information processing section 122 of the HAPSs 10 and 20 performs the cell optimization control according to the received cell-optimization control information (S7). Specifically, various communication parameters are changed in order to change at least one of the positions and sizes of the three-dimensional cells 41 and 42 so that the communication quality of the terminal apparatus located in the three-dimensional cells 41 and 42 is improved.

By changing the positions of the three-dimensional cells 41 and 42, some of the terminal apparatuses located in the three-dimensional cells 41 and 42 may be out of service, or some of the terminal apparatuses outside the service area of the three-dimensional cells 41 and 42 may be in service. By changing the positions of the three-dimensional cells 41 and 42 so that the number of terminal apparatuses in the out of the service area is larger than the number of terminal apparatuses in the service area, the number of terminal apparatuses located in the three-dimensional cells 41 and 42 can be reduced, and the communication quality of the terminal apparatuses can be improved.

In case of changing the sizes of the three-dimensional cells 41 and 42, some of the terminal apparatuses located in the three-dimensional cells 41 and 42 may be out of service, or some of the terminal apparatuses outside the service area of the three-dimensional cells 41 and 42 may be in service. Therefore, by changing the sizes of the three-dimensional cells 41 and 42 so that the number of terminal apparatuses in the out of the service area is larger than the number of terminal apparatuses in the service area, the number of terminal apparatuses located in the three-dimensional cells 41 and 42 can be reduced, and the communication quality of the terminal apparatuses can be improved. Furthermore, when the sizes of the three-dimensional cells 41 and 42 are reduced, the radio-wave intensity of the 3D cell-formation antenna section 111 forming the three-dimensional cells 41 and 42 is increased, and the communication quality of the terminal apparatuses is improved.

Hereinafter, an example of changing the positions and sizes of the three-dimensional cells 41 and 42 are described, in which the positions and sizes are changed so as to narrow down to a partial area (hereinafter referred to as "target area") where the number of terminal apparatuses of performing communications with the predetermined frequency band in the three-dimensional cells 41 and 42 exceeds a specified number.

An antenna capable of forming a beam having directivity is used for the 3D cell-formation antenna section 111 in the present embodiment. For example, an array antenna, in which a plurality of antenna elements comprising of omni-directional antennas (omni antennas) are disposed, may be used to control a signal phase of each antenna element to form a beam having directivity. Further, for example, it may be a directional antenna in which a beam having directivity is formed by a single antenna such as a horn antenna. Moreover, for example, an array antenna in which a plurality of antenna elements comprising of directional antennas are disposed may be used to control a signal phase of each antenna element to form a beam having directivity. Herein, an example of using an array antenna for the 3D cell-formation antenna section 111 is described, in which a plurality of antenna elements comprising of omnidirectional antennas are disposed in the array antenna.

The signal-information processing section 122 in the present information processing example 1 changes the positions and sizes of the three-dimensional cells 41 and 42 by controlling the beam formed with the 3D cell-formation antenna section 111 by the beam control section 123. The beam control section 123 as a specific example has a beam forming function that performs a transmission and reception by directing a beam to a predetermined direction using the 3D cell-formation antenna section 111 under an instruction of the signal-information processing section 122. A plurality of types of candidate data for precoding, which can be used in the beam forming function, are stored in storage sections of the HAPSs 10 and 20.

Herein, the beam forming function by precoding is a function for controlling a beam by preparing a plurality of types (N) of combinations of signal phases for respective antenna elements of the 3D cell-formation antenna section 111 (array antenna) so as to receive a beam transmitted to a specific direction or a beam from a specific direction, selecting one of the types of combinations and preforming a precoding control. In the present information processing example 1, the remote control apparatus 85, in the traffic analysis process, specifies a relative position of a target area with respect to the 3D cell-formation antenna section 111 of the HAPSs 10 and 20 (relative direction, relative distance or the like of the target area with respect to the 3D cell-formation antenna section 111) based on the result of the traffic analysis. The remote control apparatus 85 transmits a cell-optimization control signal including the specified relative position of the target area from the communication station for HAPS control 75 to the signal-information processing section 122 of the HAPSs 10 and 20 via the control antenna section 120 and the transmission/reception section 121 of the HAPSs 10 and 20. The signal-information processing section 122 of the HAPSs 10 and 20 executes a cell optimization control according to the received cell-optimization control information, selects a precoding that is optimum for the relative position of the target area, instructs the beam control section 123 to perform the selected precoding, and the beam control section 123 controls the beam so that the beam is directed to the target area.

FIG. 7 is a flowchart showing a control flow of a series of the cell optimization processes including the beam control for changing the positions and sizes of the three-dimensional cells 41 and 42 formed by the 3D cell-formation antenna section 111 in the present information processing example 1.

In the present information processing example 1, as described above, first, the remote control apparatus 85 acquires the current position information of the HAPSs 10 and 20 from the HAPSs 10 and 20, and specifies the current positions of the HAPSs 10 and 20 (S11). The remote control apparatus 85 also acquires information on moving directions (attitudes) of the HAPSs 10 and 20 from the HAPSs 10 and 20, and specifies the moving directions of the HAPSs 10 and 20 (S12). The information on the positions and attitudes of the HAPSs 10 and 20 is acquired based on outputs of a GPS receiver, a gyro sensor, an acceleration sensor or the like incorporated in the HAPS, and is transmitted from the control antenna section 120 and the transmission/reception section 121 to the remote control apparatus 85 via the communication station for HAPS control 75.

Subsequently, the remote control apparatus 85 specifies a relative position of a target area with respect to the 3D cell-formation antenna section 111 of the HAPSs 10 and 20 (relative direction, relative distance or the like of the target area with respect to the 3D cell-formation antenna section 111 of the HAPSs 10 and 20) based on the specified positions and moving directions (attitude) of the HAPSs 10 and 20 and the result of the traffic analysis described above (S13). The distance between the 3D cell-formation antenna section 111 and the target area can be calculated from the current positions of the HAPSs 10 and 20 and the relative position of the target area. The direction of the target area viewed from the 3D cell-formation antenna section 111 can be calculated from the current positions of the HAPSs 10 and 20 and the relative position of the target area after specifying the direction (orientation) in which the 3D cell-formation antenna section 111 faces from the moving direction of the HAPSs 10 and 20.

After specifying the direction and distance of the target area viewed from the HAPSs 10 and 20 in this way, since the relative position of the target area with respect to the 3D cell-formation antenna section 111 is specified, the remote control apparatus 85 transmits a cell-optimization control signal including the specified relative position of the target area from the communication station for HAPS control 75 to the signal-information processing section of the HAPSs 10 and 20 via the control antenna section 120 and the transmission/reception section 121 of the HAPSs 10 and 20 (S14).

Upon receiving the cell-optimization control signal (S15), the signal-information processing section 122 of the HAPSs 10 and 20 executes the cell optimization control according to the received cell-optimization control information, and selects a precoding candidate optimal for transmitting and receiving radio waves between the 3D cell-formation antenna section 111 and the target area, from the plurality of types of precoding candidates stored in the storage section (S16). Specifically, a precoding candidate for directing the beam of the 3D cell-formation antenna section 111 to the target area is selected based on the relative position of the target area with respect to the 3D cell-formation antenna section 111.

The precoding candidates in the present information processing example 1 are comprised of those to form beams with different directions and widths. Therefore, the beam direction is specified according to the direction of the target area viewed from the HAPSs 10 and 20, the beam width is specified according to the distance of the target area, and a precoding candidate complying with the specified beam direction and beam width is selected. It is noted that, a wider beam width may be selected as the distance of the target area is longer. Since the target area easily goes out of the beam range by a slight change (a slight change in orientation of 3D cell-formation antenna section 111) in the moving direction of the HAPSs 10 and 20 as the distance of the target area is longer, it is easier to realize more stable radio communications by selecting a wider beam width as the distance of the target area is longer. Conversely, a narrower beam width may be selected as the distance of the target area is longer. By narrowing the beam width, it become capable of performing a radio communication with a farther target area.

When the precoding candidate is selected by the signal-information processing section 122 of the HAPSs 10 and 20, the precoding candidate data is transmitted to the beam control section 123. The beam control section 123 controls the 3D cell-formation antenna section 111 depending on the precoding candidate data, and the 3D cell-formation antenna section 111 performs a precoding control for controlling the signal phase of each antenna element of the array antenna forming the 3D cell-formation antenna section 111 depending on the precoding candidate data (S17). Accordingly, the beam of the 3D cell-formation antenna section 111 is directed to the target area, a stable radio communication with high gain is realized via the 3D cell-formation antenna section 111 and the target area, and as a result, it can be realize to decrease the communication traffic.

After that, the signal-information processing section 122 and the beam control section 123 execute a precoding control for directing the beam of the 3D cell-formation antenna section 111 to the target area depending on the change in the direction and distance of the target area (S18 to S22) until the processing is completed (Yes in S23).

Specifically, the current position information on the own HAPSs 10 and 20 is acquired at a predetermined timing, and the current positions of the HAPSs 10 and 20 are specified thereby (S18). The information on the moving direction of the own HAPSs 10 and 20 is also acquired, and the moving directions of the HAPSs 10 and 20 are specified thereby (S19). After that, the signal-information processing section 122 performs a process of specifying the direction and distance of the target area viewed from the HAPSs 10 and 20 using the current position and moving direction of the HAPSs 10 and 20 and the position information on the target area obtained from the cell optimization information received from the remote control apparatus (S20). Then, the signal-information processing section 122 selects a precoding candidate depending on the relative position of the target area with respect to the 3D cell-formation antenna section 111 specified thereby (S21), and transmits the precoding candidate data to the beam control section 123. The beam control section 123 performs a precoding control depending on the precoding candidate data (S22).

Thereby, even if the relative position (direction and distance) of the target area changes with the movement of the HAPSs 10 and 20, the beam of the 3D cell-formation antenna section 111 can be directed to the target area by following the change in the relative position of the target area. The timing for performing this control can be set arbitrarily, and it is preferable to set the timing at a higher frequency in order to accurately follow the beam of the 3D cell-formation antenna section 111 depending on the change in the relative position of the target area.

In the present information processing example 1, the change in the beam direction of the 3D cell-formation antenna section 111 may be realized, for example, by driving a support stand that supports the 3D cell-formation antenna section 111 and changing the direction in which the 3D cell-formation antenna section 111 faces.

Further, in the present information processing example 1, until the next traffic-analysis start condition is satisfied, although the absolute position of the target area is fixed and the relative position (direction and distance) of the target area with respect to the HAPSs 10 and 20 changes with the movement of the HAPSs 10 and 20, the beam is controlled so as to follow depending on the change in the relative position of the target area. This control is effective, for example, when the terminal apparatuses are temporarily concentrated in a specific area.

On the other hand, the areas of the three-dimensional cells 41 and 42 may be moved every moment with the movement of the HAPSs 10 and 20 without the following of the beam of the 3D cell-formation antenna section 111. In this case, since the terminal apparatuses locating in the three-dimensional cells 41 and 42 are switched to others every moment along with the movement of the HAPSs 10 and 20, the traffic of the three-dimensional cells 41 and 42 changes every moment. Therefore, it is preferable to shorten the time interval satisfying the traffic-analysis start condition, and repeatedly perform the traffic analysis process and the cell optimization process at short time intervals.

Although the present information processing example 1 is an example of forming a single beam by the 3D cell-formation antenna section 111, it is also possible to form a plurality of beams by the 3D cell-formation antenna section 111 and form a plurality of three-dimensional cells 41 and 42. In this case, by changing at least one of the positions and sizes of the plurality of three-dimensional cells 41 and 42, the communication quality of all the terminal apparatuses of the plurality of three-dimensional cells 41 and 42 may be improved as a whole. For example, at least one of the positions and sizes of the three-dimensional cells 41 and 42 is changed so that the difference in the number of connected terminal apparatuses is reduced among the plurality of three-dimensional cells 41 and 42 formed by a plurality of beams of the 3D cell-formation antenna section 111.

Specifically, the remote control apparatus 85, in the traffic analysis process described above, analyzes which band is used at which position by how many number of terminal apparatuses are used in the whole of the plurality of three-dimensional cells 41 and 42 formed by the 3D cell-formation antenna section 111. Then, the remote control apparatus 85 specifies an area (target area) for forming each of the three-dimensional cells 41 and 42 so that the number of connected terminal apparatuses of the three-dimensional cells 41 and 42 is equalized between the cells, based on the result of the traffic analysis. That is, the relative position of each target area with respect to the 3D cell-formation antenna section 111 of the HAPSs 10 and 20 is specified. After specifying the relative position of each target area in this way, the remote control apparatus 85 transmits a cell-optimization control signal including the specified relative position of each target area from the communication station for HAPS control 75 to the HAPSs 10 and 20 via the control antenna section 120 and the transmission/reception section 121 of the HAPSs 10 and 20. The signal-information processing section 122 of the HAPSs 10 and 20 executes a cell optimization control according to the received cell-optimization control information, selects a precoding that is optimum for the relative position of each target area, and controls the beams so that the beams are directed to these target areas.

[Information Processing Example 2] Next, another example of controlling a cell optimization process in the present embodiment (hereinafter, the present example is referred to as "information processing example 2") is described.

The present information processing example 2 also analyzes the traffic of the three-dimensional cells 41 and 42 formed by the relay communication stations 110 and 210, and performs a cell optimization process for optimizing the three-dimensional cells 41 and 42. It is noted that, in the information processing example 1, although the example of optimizing the three-dimensional cells 41 and 42 formed by the 3D cell-formation antenna section 111 mounted on one HAPS 10 and 20 has been described, the present information processing example 2 is an example of totally optimizing a plurality of three-dimensional cells 41 and 42 formed by a plurality of HAPSs 10 and 20 in which the plurality of HAPSs 10 and 20 cooperate with each other.

Specifically, in the present information processing example 2, in order to reduce the difference in the number of connected terminal apparatuses between the plurality of three-dimensional cells 41 and 42 formed by the 3D cell-formation antenna sections 111 mounted on the plurality of HAPSs 10 and 20, at least one of the positions and sizes of the three-dimensional cells 41 and 42 is changed. In this case, a cooperative control by the plurality of HAPSs 10 and 20 is managed by the remote control apparatus 85.

Figure 8:
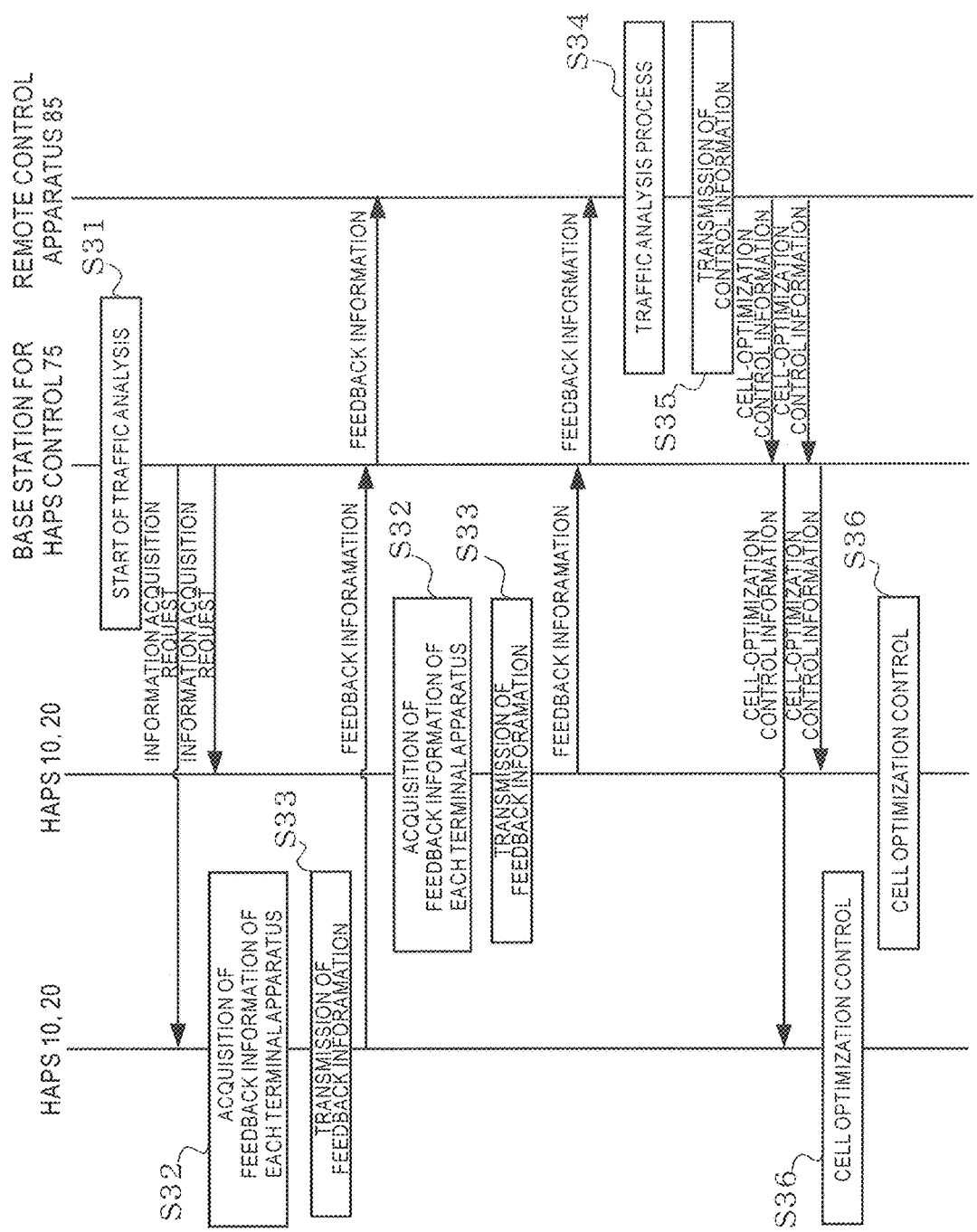
FIG. 8 is a sequence diagram showing an example of the cell optimization process in the case of forming a plurality of three-dimensional cells by a plurality of HAPSs in the information processing example 2.

FIG. 8 is a sequence diagram showing an example of controlling a cell optimization process when forming the plurality of three-dimensional cells 41 and 42 with the plurality of HAPSs 10 and 20 in the present information processing example 2. It is noted that, in the sequence diagram in FIG. 8, the communication between each HAPS 10 and 20 and the feeder station 70 and the terminal apparatus as shown in FIG. 6 is omitted.

In the present information processing example 2, the remote control apparatus 85 on the ground side or on the sea side determines whether or not a predetermined traffic-analysis start condition is satisfied. When the predetermined traffic-analysis start condition is satisfied and the traffic analysis process is started (S31), the remote control apparatus 85 transmits an information acquisition request to each of the corresponding HAPSs 10 and 20 via the communication station for HAPS control 75. The signal-information processing section 122 of each HAPS 10 and 20 that has received the information acquisition request, similar to the information processing example 1 described above, transmits an information acquisition request for traffic analysis from the 3D cell-formation antenna section 111 to the terminal apparatuses located in the respective three-dimensional cells 41 and 42, and acquires feedback information for traffic analysis from each terminal apparatus (S32).

The signal-information processing section 122 of each HAPS 10 and 20 that has acquired the feedback information for traffic analysis from each terminal apparatus, further acquires current position information and moving direction information of the own HAPSs 10 and 20. Then, the signal-information processing section 122 transmits the current position information and the moving direction information of the own HAPSs 10 and 20, and the position information and used-band information on each terminal apparatus located in the three-dimensional cells 41 and 42 of the own HAPSs 10 and 20 as feedback information from the control antenna section 120 and the transmission/reception section 121, to the remote control apparatus 85 via the communication station for HAPS control 75 (S33).

In this way, the remote control apparatus 85 acquires the current position information and the moving direction information of the plurality of HAPSs 10 and 20, and the feedback information of each terminal apparatus over the plurality of three-dimensional cells 41 and 42 formed by the plurality of HAPSs 10 and 20. After that, the remote control apparatus 85 performs a traffic analysis process for analyzing the traffic of these three-dimensional cells 41 and 42 (S34). In the traffic analysis process in the present information processing example 2, which band is used at which position in the whole of the plurality of three-dimensional cells 41 and 42 by how many number of terminal apparatuses are analyzed. Then, it is determined whether or not a predetermined cell-optimization execution condition is satisfied, and if the predetermined cell-optimization execution condition is satisfied, cell-optimization control information is generated so that the communication quality of the terminal apparatuses is totally improved overall in the plurality of three-dimensional cells 41 and 42.

The cell-optimization execution condition is a condition for determining whether or not it is necessary to improve the communication quality of the terminal apparatuses as a whole in the plurality of three-dimensional cells 41 and 42 based on the result of the traffic analysis, and can be set arbitrarily.

The cell-optimization control information in the present information processing example 2 includes information that specifies an area (target area) for forming each of the three-dimensional cell 41 and 42 so that the number of connected terminal apparatuses of the three-dimensional cell 41 and 42 is equalized between the cells, based on the result of traffic analysis. That is, it includes information that specifies a relative position of each target area with respect to the 3D cell-formation antenna section 111 of each of the HAPS 10 and 20. When the relative position of each target area is specified in this way, cell-optimization control information including the relative position of each of the target area is transmitted to each of the HAPS 10 and 20 via the communication station for HAPS control 75 (S35).

The signal-information processing section 122 of each HAPS 10 and 20 executes a cell optimization control according to the received cell-optimization control information (S36). Specifically, the signal-information processing section 122 of each of the HAPSs 10 and 20 selects a precoding that is optimum for the relative position of the corresponding target area, and controls the beam control section 123 so that the beam is directed to this target area.

It is noted that, the process steps and configuration elements of the various equipment, etc. mounted on the flying object such as the HAPSs 10 and 20, the feeder station, the remote control apparatus, the terminal apparatus (user apparatus, mobile station, communication terminal) and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, relay communication station, feeder station, base station apparatus, radio-relay station apparatus, terminal apparatus (user apparatus, mobile station, communication terminal), remote control apparatus, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 HAPS (solar plane type)
20 HAPS (airship type)
40 cell-formation target airspace
41, 42, 43 three-dimensional cell
60 drone
65 airplane
70 feeder station
72 artificial satellite
75 communication station for HAPS control
80 mobile communication network
85 remote control apparatus
101 main wing section
102 solar panel (solar photovoltaic panel)
103, 202 propeller
104 connection section
105 pod
106, 204 battery
107 wheel
110, 210 relay communication station
111 three-dimensional (3D) cell-formation antenna section
112 transmission/reception section
113 feeder antenna section
114 transmission/reception section
116 monitoring control section
117 power source section
118 modem section
119 base-station processing section
120 control antenna section
121 transmission/reception section
122 signal-information processing section
123 beam control section
125 external communication section
126 beam control section
140 radio-communication antenna apparatus
141 motor drive section

The invention claimed is:
1. A communication relay apparatus, comprising:
a relay communication station for relaying a communication between a terminal apparatus and a communi- cation network via a feeder link for mobile communication, the relay communication station being mounted on a flying object;
a radio communication section for transmitting and receiving control information to and from a remote control apparatus via a radio communication line for flight control and a communication station for control, the radio communication line being different from the feeder link for mobile communication and the communication station for control being provided separately from a feeder station of relaying a communication between the terminal apparatus and the communication network; and
a control section for controlling the relay communication station based on the control information received from the remote control apparatus by the radio communication section, and
wherein the control section performs a cell optimization process for optimizing a cell formed by the relay communication station based on cell optimization control information including a relative position of a target area of the cell to be formed, the cell optimization control information being received from the remote control apparatus, and
wherein the control section repeatedly performs a beam control process for controlling a beam from the relay communication station to direct to the target area based on a current position and a moving direction of the communication relay apparatus, after the cell optimization process, and
wherein a frequency band of the radio communication line for flight control used by the radio communication section for a radio communication with the remote control apparatus is a frequency band lower than a frequency band of the feeder link performed by the relay communication station to communicate with the communication network.

2. The communication relay apparatus according to claim 1,
wherein the cell optimization process includes a cell adjustment process for adjusting at least one of a position and a size of the cell by controlling the relay communication station.

3. The communication relay apparatus according to claim 2,
wherein the cell adjustment process is for changing at least one of the position and the size of the cell so as to reduce a difference in number of terminal apparatuses connected to each cell between a plurality of cells formed by the relay communication station of the communication relay apparatus, or between a cell formed by the relay communication station of the communication relay apparatus and a cell formed by another relay communication station mounted on another flying object.

4. The communication relay apparatus according to claim 1, comprising an information-transmission processing section for performing a process of transmitting information for traffic analysis for analyzing traffic of a cell formed by the relay communication station, from the radio communication section to the remote control apparatus.

5. The communication relay apparatus according to claim 1,
wherein the relay communication station is a base station or a repeater for mobile communication.

6. A cell optimization system comprising:
the communication relay apparatus according to claim 1; and
a remote control apparatus for generating the cell optimization control information for optimizing a cell formed by the relay communication station of the communication relay apparatus and transmitting the cell optimization control information to the communication relay apparatus.

7. The communication relay apparatus according to claim 1, comprising a beam control section for performing a transmission and reception by directing a beam to a predetermined direction using a cell-formation antenna section,
wherein the control section:
receives a cell-optimization control signal from the remote control apparats, the cell-optimization control signal including control information of a relative position and distance of a target area with respect to the cell-formation antenna section of the relay communication station, the relative position and distance being specified based on a position and moving direction of the communication relay apparatus by the remote control apparatus;
selects a precoding candidate optimal for transmitting and receiving radio waves between the cell-formation antenna section and the target area, from a plurality of types of precoding candidates; and
transmits the selected precoding candidate to the beam control section, and
wherein the beam control section controls the cell-formation antenna section depending on the selected precoding candidate, and
wherein the cell-formation antenna section performs a precoding control for controlling a signal phase of each antenna element of array antenna forming the cell-formation antenna section depending on the selected precoding candidate.

8. A remote control apparatus, comprising:
means for generating the cell optimization control information for optimizing the cell formed by the relay communication station of the communication relay apparatus according to claim 1; and
means for transmitting the cell optimization control information to the communication relay apparatus.

9. The remote control apparatus according to claim 8, comprising:
means for specifying a relative position and distance of a target area with respect to a cell-formation antenna section of the relay communication station;
means for generating a cell-optimization control signal including control information of the relative position and distance of the target area with respect to the cell-formation antenna section of the relay communication station; and
means for transmitting the cell-optimization control signal to the communication relay apparatus.

10. A cell optimization method of optimizing a cell formed by a communication relay apparatus comprising a relay communication station for relaying a communication between a terminal apparatus and a communication network via a feeder link for mobile communication, the relay communication station being mounted on a flying object locating in a stratospheric airspace, the method comprising:
transmitting cell optimization control information to the communication relay apparatus via a radio communication line for flight control and a communication station for control, the radio communication line being different from the feeder link for mobile communication and the communication station for control being provided separately from a feeder station of relaying a communication between the terminal apparatus and the communication network, by a remote control apparatus;

receiving the cell optimization control information including a relative position of a target area of the cell to be formed, from the remote control apparatus via the radio communication line for flight control and the communication station for control, by the communication relay apparatus;

performing a cell optimization process for optimizing the cell formed by the relay communication station based on the cell optimization control information received from the remote control apparatus, by the communication relay apparatus, and repeatedly performing a beam control process for controlling a beam from the relay communication station to direct to the target area based on a current position and a moving direction of the communication relay apparatus, after the cell optimization process, wherein a frequency band of the radio communication line for flight control used by the radio communication section for a radio communication with the remote control apparatus is a frequency band lower than a frequency band of the feeder link performed by the relay communication station to communicate with the communication network.

11. The cell optimization method by according to claim 10, the cell optimization method comprising:

receiving a cell-optimization control signal from the remote control apparats, the cell-optimization control signal including control information of a relative position and distance of a target area with respect to the relay communication station, the relative position and distance being specified based on a position and moving direction of the communication relay apparatus by the remote control apparatus;

selecting a precoding candidate optimal for transmitting and receiving radio waves between the relay communication station and the target area, from a plurality of types of precoding candidates; and performing a precoding control depending on the selected precoding candidate.

* * * * *